US012700055B1

(12) United States Patent
Roskind

(10) Patent No.: US 12,700,055 B1
(45) Date of Patent: Aug. 4, 2026

(54) SCALABLE GRAPHIC PROCESSING UNIT ALLOCATION INFRASTRUCTURE

(71) Applicant: Amazon Technologies, Inc., Seattle, WA (US)

(72) Inventor: James Anthony Roskind, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 18/759,281

(22) Filed: Jun. 28, 2024

(51) Int. Cl.
*G06T 1/20* (2006.01)
*G06F 9/50* (2006.01)

(52) U.S. Cl.
CPC .............. *G06T 1/20* (2013.01); *G06F 9/5038* (2013.01)

(58) Field of Classification Search
CPC ................................. G06T 1/20; G06F 9/5038
See application file for complete search history.

(56) References Cited

U.S. PATENT DOCUMENTS

| | | | | |
|---|---|---|---|---|
| 2008/0244213 A1* | 10/2008 | Flemming | ........... | G06F 11/3433 711/173 |
| 2021/0026696 A1* | 1/2021 | Chen | ...................... | G06F 9/5022 |
| 2021/0240524 A1* | 8/2021 | Gangani | .............. | G06F 9/5061 |
| 2022/0414817 A1* | 12/2022 | Zad Tootaghaj | ...... | G06F 9/5072 |
| 2023/0089925 A1* | 3/2023 | Cho | ...................... | G06F 9/4881 718/102 |
| 2025/0285206 A1* | 9/2025 | Wu | ........................... | G06T 1/60 |
| 2025/0321780 A1* | 10/2025 | Mukherjee | ................ | G06T 1/20 |

* cited by examiner

*Primary Examiner* — Maurice L. Mcdowell, Jr.
(74) *Attorney, Agent, or Firm* — Knobbe, Martens, Olson & Bear, LLP

(57) ABSTRACT

Systems and methods are provided for classifying usage of computational resources and allocating the resources according to the classifications. The classifications may correspond to a first usage type, a second usage type, or a third usage type. The system may allocate resources according to the classification, scheduling jobs in the first usage type before jobs in the second usage type and jobs in the third usage type.

20 Claims, 7 Drawing Sheets

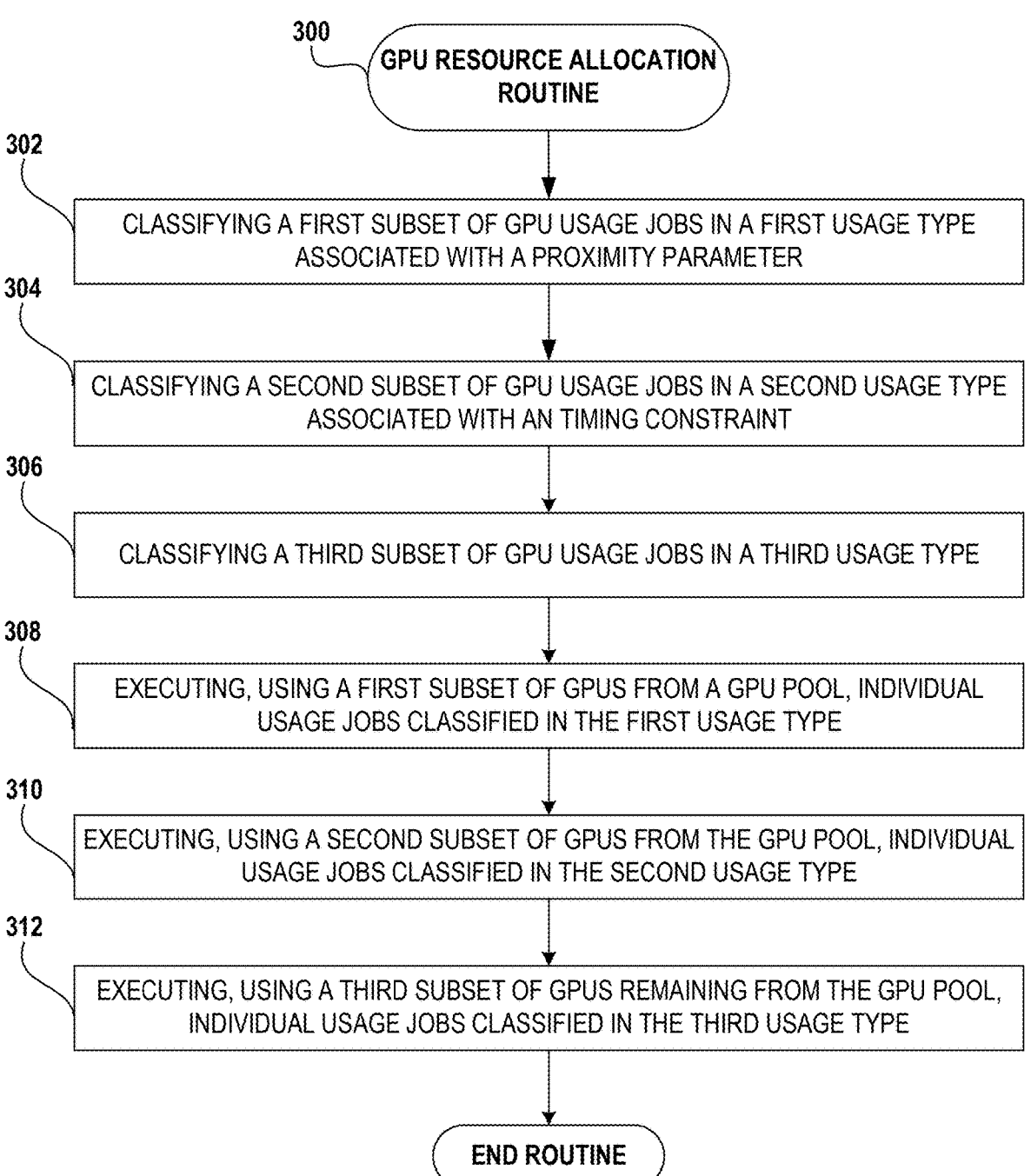

300

GPU RESOURCE ALLOCATION
ROUTINE

302

CLASSIFYING A FIRST SUBSET OF GPU USAGE JOBS IN A FIRST USAGE TYPE
ASSOCIATED WITH A PROXIMITY PARAMETER

304

CLASSIFYING A SECOND SUBSET OF GPU USAGE JOBS IN A SECOND USAGE TYPE
ASSOCIATED WITH AN TIMING CONSTRAINT

306

CLASSIFYING A THIRD SUBSET OF GPU USAGE JOBS IN A THIRD USAGE TYPE

308

EXECUTING, USING A FIRST SUBSET OF GPUS FROM A GPU POOL, INDIVIDUAL
USAGE JOBS CLASSIFIED IN THE FIRST USAGE TYPE

310

EXECUTING, USING A SECOND SUBSET OF GPUS FROM THE GPU POOL, INDIVIDUAL
USAGE JOBS CLASSIFIED IN THE SECOND USAGE TYPE

312

EXECUTING, USING A THIRD SUBSET OF GPUS REMAINING FROM THE GPU POOL,
INDIVIDUAL USAGE JOBS CLASSIFIED IN THE THIRD USAGE TYPE

END ROUTINE

*Fig. 3*

SCALABLE GRAPHIC PROCESSING UNIT ALLOCATION INFRASTRUCTURE

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is a flow diagram of an illustrative routine for classifying usage jobs and executing the usage jobs according to some embodiments.

DETAILED DESCRIPTION

Figure 1:
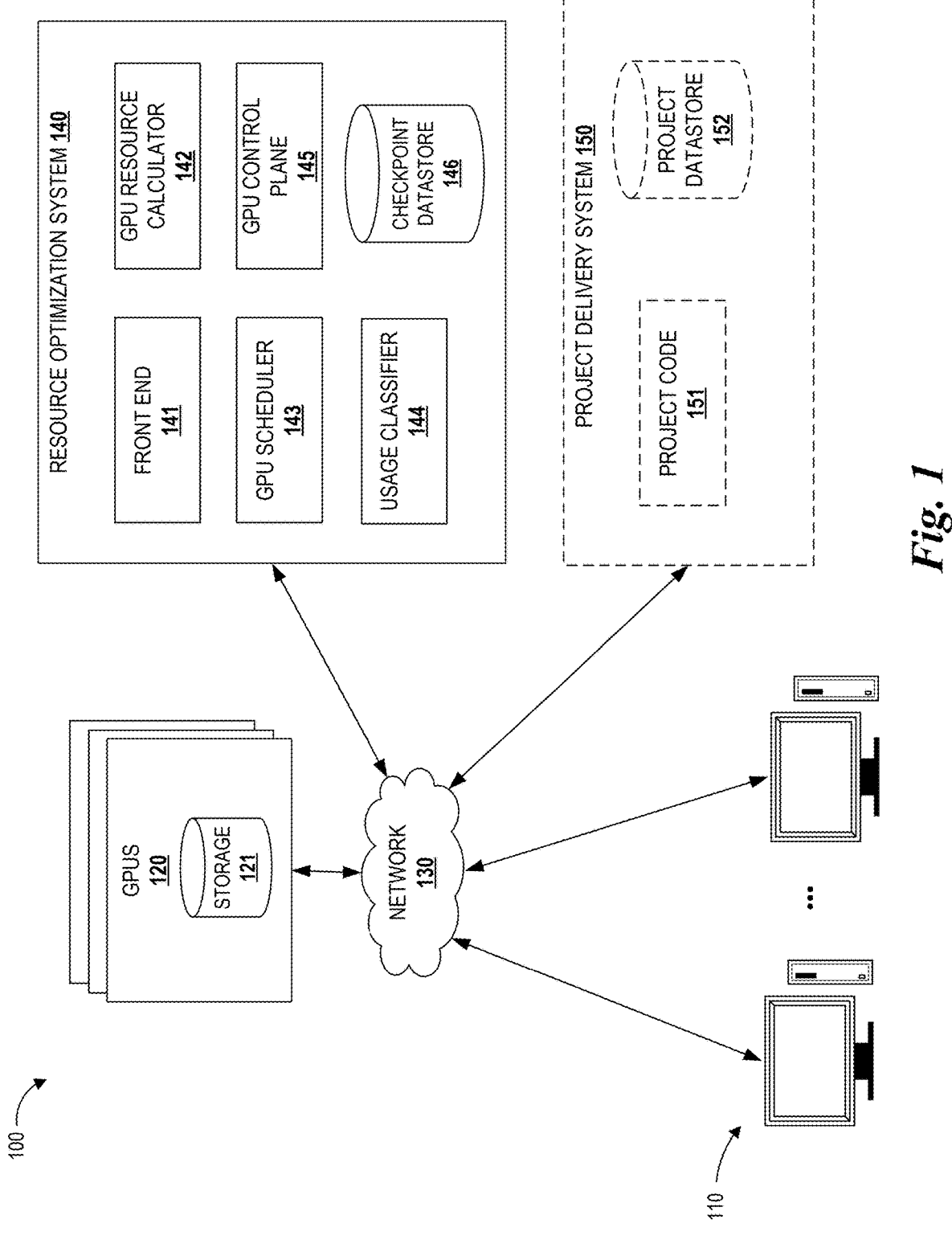
FIG. 1 is a block diagram illustrating a scalable graphic processing unit (GPU) allocation infrastructure system according to some embodiments.

The present disclosure relates to efficient use of computational resources by classifying usage of the computational resources and allocating resources according to the classified uses. Advantageously, allocating computational resources according to classified usage (e.g., usage with a timing constraint on when the resources are to be available, usage with a proximity constraint on the proximity or networking connectivity between the resources, usage with fewer constraints or otherwise more flexible parameters, etc.) allows for greater overall utilization of the computational resources than conventional allocation methods. Achieving greater overall utilization can be especially impactful with computing resources used to innovate or provide other high-value services (e.g., computing resources such as graphics processing units or "GPUs").

Some conventional approaches statically allocate computational resources (such as GPUs) according to a quantity of GPUs available to an organization. Organizations may have many engineers desiring to use GPUs. The engineers may wish to use GPUs for performing training of machine learning models (such as large language models), experimentation and design for product development, to perform inference using the machine learning models for a set period of time, or various other tasks. However, allocating a static quantity of GPUs to individual engineers or teams thereof may result in inefficient use of resources due to the engineers or teams leaving GPUs idle while not in use. When availability of GPUs is constrained due to static allocation, other engineers and teams may be prevented from obtaining the resources to support their jobs. For example, a team of engineers at an organization may request 100 GPUs for a job. The organization may allocate the 100 GPUs to the team regardless of job type (e.g., on a first-come first-served basis), and the GPUs may remain allocated to the team for a predetermined period of time or until the team releases them back to the pool, regardless of what the team does or does not do with the GPUs while allocated and regardless of the actual technical parameters of the job for which they are allocated. The team may leave the GPUs idle due to GPU workloads typically occurring in bursts—where in some cases, project development time outweighs time spent operating the GPUs for the project—or even the team lacks available personnel to work on the project. Having the resources allocated to the team but left idle results in the computational resources being left unused by anyone, including others who may benefit from using the resources. The static allocation is inefficient due to a lack of schedule adaptability and automatic preemption of workloads according to policies and priorities within each team's initiative.

Some aspects of the present disclosure address some or all of the issues noted above, among others, by efficiently allocating computational resources based on classifying usage and scheduling resources according to a usage type classification (also referred to herein as a "usage type" or "usage class" for brevity). Users (e.g., engineers, teams, etc.) with a computing job may request allocation of resources for the job or otherwise submit details regarding the job. The job details may include information regarding the usage type, a resource allocation amount, other details, or some combination thereof. A usage classifier may use the job details to classify usage of the computing resources into one of a set of usage classes or usage types (e.g., a set of two usage types, a set of three usage types, a set of four usage types, etc.).

In some embodiments, the set of usage types may include a first usage type. For example, the first usage type may correspond to model training, such as training a large language model (LLM). Jobs classified in the first usage type may use numerous GPUs to run lengthy compute-intensive training workloads that may potentially execute for hours, days and even weeks. Further, training an LLM may include hundreds, even thousands, of GPUs operating simultaneously to achieve a target training metric. Jobs in the first usage type may include workloads using more RAM than is available on a single hosted GPU, which results in a formation of clusters of GPUs (e.g., collaborative groups of N tightly connected GPUs, where N is a positive integer in the tens, hundreds, thousands, or more). One characteristic of jobs in the first usage type is a proximity constraint for hosts in cluster. Efficient training by a cluster may be facilitated by intra-cluster topological locality of the hosts in the cluster, which provides minimal interconnect latency within the cluster for both forward and backwards propagation of data. The intra-cluster topological locality may correspond to topological considerations of allocation, such as allocating each host or cluster within a single rack of hosts, or at least on a common networking spine. Interconnected clusters may share at least a networking chain (may be referred herein as "spine") for sharing intermediate results (and/or gradients and/or checkpoints).

In some embodiments, the set of usage types may include a second usage type. For example, the second usage type may correspond to interactive experimentation, such as real-time experimentation during predefined scheduled hours (e.g., workday hours). In some examples, jobs classified in the second usage type may rely on interactive interfaces (e.g., secure shell (SSH) and/or interactive programming notebooks) to perform the experimentation using computing resources from a pool of computing resources. The second usage type may correspond to reservations for specific hours of the day, to match each planned experimentation time (e.g., 11:00 AM start time and N-hour reservation, where N is a positive integer such as 5, 6, 7, 8, etc.). In some examples, jobs classified in the second usage type may be associated with a timing constraint, such as performance during workday hours to allow the job to begin and complete during the target timeframe.

In some embodiments, the set of usage types may include a third usage type. For example, the third usage type may correspond to offline inferencing using models that have been previously trained. Jobs classified in the third usage type may benefit from additional contemporaneous GPUs and additional time-slot allocations, but may not necessarily require them to successfully complete within desired timeframes. Jobs classified in the third usage type may be characterized by predictable daily and/or weekly progress, without necessarily requiring specific times of interactive availability (e.g., no timing constraint), without necessarily requiring locality of resources (e.g., no proximity constraint), etc. In this manner, jobs in the third usage type may be scheduled to operate with predictable completion within a particular deadline and/or a service level agreement (SLA). Thus, jobs of the third usage type may fill in utilization "just in time" whenever possible. In addition, jobs of the third usage type may be allocated to GPU resources leftover after allocating the first usage type jobs and the second usage type jobs, to achieve 100% or substantially 100% utilization of the entire pool of computing resources.

In some embodiments, the set of usage types may include a fourth usage type. For example, the fourth usage type may correspond to customer access, such as driven by diurnal allocations. Customers requesting GPU resources may increase activity during daytime hours, as compared to nighttime hours. In this manner, the fourth usage type may correspond to demand predictions, such as increased GPU resource allocation according to the diurnal allocations.

Additional aspects of the present disclosure relate to allocating computing resources according to usage types. The allocation of resources may be an NP-complete problem (a solution for which is non-polynomial). For example, the allocation of resources may correspond to a bin packing problem. In this manner, allocating available computing resources is akin to pack jobs into a finite number of bins or containers (where the bins or containers are the pooled GPU resources), each of a fixed given capacity, in a way that minimizes the number of bins used. As described herein, scheduling jobs according to usage types may provide more efficient solution to allocating resources. In this manner, jobs of certain usage types (e.g., jobs classified in the first usage type with a proximity constraint) may be scheduled before other usage types, and may have resources allocated prior to allocating resources to jobs of any other usage type (e.g., to increase the likelihood of intra-cluster topological locality of the hosts in the cluster of resources assigned to jobs of the first usage type). Resources may be allocated to jobs of a second usage type prior to any remaining usage types. When completed, jobs categorized in a third usage type may have resources allocated prior to any remaining usage types. Jobs in the third usage type may be scheduled to remaining GPU resources to achieve a greater average expected utilization rate of the available resources. In this way, the computational resources may achieve complete or substantially complete utilization of computational resources.

Various aspects of the disclosure will now be described with regard to certain examples and embodiments, which are intended to illustrate but not limit the disclosure. Although aspects of some embodiments described in the disclosure will focus, for the purpose of illustration, on particular examples of computing jobs, computing resources, processing units, usage classifications, and scheduling algorithms, the examples are illustrative only and are not intended to be limiting. In some embodiments, the techniques described herein may be applied to additional or alternative computing jobs, computing resources, processing units, usage classifications, scheduling algorithms, and the like. Additionally, any feature used in any embodiment described herein may be used in any combination with any other feature or in any other embodiment, without limitation.

Network Resource Allocation Environment

With reference to an illustrative embodiment, FIG. 1 shows an example scalable GPU allocation infrastructure system 100 in which aspects of the present disclosure may be implemented. In some embodiments, as shown, the network environment may include any number of user devices 110, a pool of computing resources such as processing units (GPUs 120 in this example), a network 130, a resource optimization system 140, and a project delivery system 150. The resource optimization system 140 further includes a front end 141, a GPU resource calculator 142, a GPU scheduler 143, a usage classifier 144, a GPU control plane 145, and a checkpoint datastore 146. The project delivery system 150 includes a project code 151 and a project datastore 152. The network 130 enables communication between the GPUs 120, the resource optimization system 140, the project delivery system 150, and user devices 110.

The user devices 110 may represent users interacting with system 100 to request access to GPU resources. In some examples, users of the user devices 110 may include engineers, data scientists, or other personnel within an organization who request computational resources for jobs such as model training, product development, code execution, offline inferencing, or other uses requested by the user devices 110. The user devices 110 may provide usage requests which may include job details. In some embodiments, the job details may include information regarding the usage type, a resource allocation amount, other details, or some combination thereof. For example, the job details may include number of GPUs requested and an estimated time for job beginning and/or completion. The requests may be transmitted to other components of the system 100 to determine the appropriate allocation of GPU resources.

The GPUs 120 may be the computational resources managed by the system 100. In some embodiments, the GPUs 120 each may have access to storage 121 (such as a solid state drive (SSD)). The GPUs 120 may be pooled and allocated for jobs based on GPU resource budget and scheduling of the respective jobs. The GPUs 120 may be capable of performing compute-intensive jobs, such as training models (e.g., large language models), and may be organized into clusters for efficient processing. The allocation of GPUs 120 may correspond to factors such as the number of GPUs required, the duration of the job, and the topological considerations for minimizing interconnect latency.

In some embodiments, the network 130 may be a publicly-accessible network of linked networks, possibly operated by various distinct parties, such as the Internet. In some cases, the network 130 may be or include a private network, personal area network, local area network, wide area network, global area network, cable network, satellite network, cellular data network, etc., or a combination thereof, some or all of which may or may not have access to and/or from the Internet. Although FIG. 1 illustrates a single network 130, the illustration is provided for purposes of example only, and is not intended to be limiting, required, or exhaustive. In some embodiments, the network 130 may include, or be in communication with, a plurality of networks. For example, the network 130 may include an internal network and a backbone network. The internal network may include a network connecting the GPUs 120 together. In this way, the internal network may provide the GPUs 120 a bandwidth dedicated for GPU usage, which may allow for the GPUs 120 to interact with the storage 121 without competing for networking resources. The backbone network may connect services between the components as illustrated in FIG. 1.

The resource optimization system 140 may manage the allocation and scheduling of GPU resources (or other machine learning accelerators). The resource optimization system 140 may include several sub-components that operate to optimize GPU usage. The sub-components may include the front end 141, the GPU resource calculator 142, the GPU scheduler 143, the usage classifier 144, the GPU control plane 145, and the checkpoint datastore 146.

The front end 141 may provide an interface through which usage requests from the user devices 110 are received. The front end 141 may collect information from the requests, such as job type and resource requirements, and may transmit the information to other components within the resource optimization system 140 for further processing. In some examples, the front end 141 may provide a user interface (such as graphical user interface or "GUI") with which the user devices 110 may interact. For example, the front end 141 may provide, to user devices 110, instructions to graphically display controls for submission of usage requests and a queue of jobs that are currently pending, being performed, and/or are awaiting operation. The instructions provided by front end 141 may be presented by an application, such a browser application, executing on a computing device, such as a client computing device.

The GPU resource calculator 142 may compute available GPU resources and may determine feasibility of fulfilling the usage requests. The GPU resource calculator 142 may compare the requested resources against the available pool of GPUs 120, taking into account the job overhead and GPU resource budget. In some embodiments, the job overhead may correspond to the usage of the computational resources and at least one job requirement. The job requirement may include at least one of a number of GPUs needed to perform the GPU usage jobs, proximity of requested GPUs, time to run, GPU configuration (such as pausing GPUs, storing memory/images of GPUs, and restarting GPUs), job start timing and job stop timing, and a usage classification.

The GPU scheduler 143 may schedule the GPU usage jobs based at least partly on the classifications provided by usage classifier 144 and GPU resources available (or other machine learning accelerators). The GPU scheduler 143 may prioritize jobs according to their respective usage categories and may schedule the jobs to achieve complete or substantially complete utilization of GPUs 120, when considering the specific jobs to be executed and the pool of GPUs available to execute the jobs. The GPU scheduler 143 may identify unused GPU resources and may schedule additional jobs to increase utilization rates. In some embodiments, allocation of GPUs may be performed using a bin packing algorithm, and the GPU scheduler 143 may solve the bin packing problem associated with allocating the GPU resources for competing usage requests.

The usage classifier 144 may classify the usage of the computational resources into distinct classified uses based on the job type and associated parameters such as proximity parameters and timing constraints. The usage classifier 144 may determine the job type of each job and the eligibility for GPU resource allocation.

The GPU control plane 145 may manage the execution of GPU usage jobs by controlling the allocated GPU resources. The GPU control plane 145 may ensure the jobs execute according to the schedule determined by the GPU scheduler 143 and the resources are used efficiently.

The checkpoint datastore 146 may maintain a record of the state of GPU usage jobs and resource allocations. The checkpoint datastore 146 may ensure the system 100 can recover from stoppages and continue operations without loss of data or significant downtime.

The project delivery system 150 may facilitate storage of files for execution of the jobs requested. The project delivery system 150 may rely on software tools and services that facilitate the deployment of project code 151 and the storage and retrieval of project data from project datastore 152. In some embodiments, the project code 151 may include executable code that user devices 110 provide as part of the GPU usage requests. The GPUs 120 may execute the project code 151 to perform the jobs requested. The project datastore 152 may include a data repository of data related to the GPU usage jobs. The project datastore 152 may include datasets used for model training, intermediate results, and final outputs of the computational jobs. The data within project datastore 152 may be accessible and manipulated by project code 151 during the execution of GPU usage jobs.

Resource Allocation Data Flow

Figure 2A:
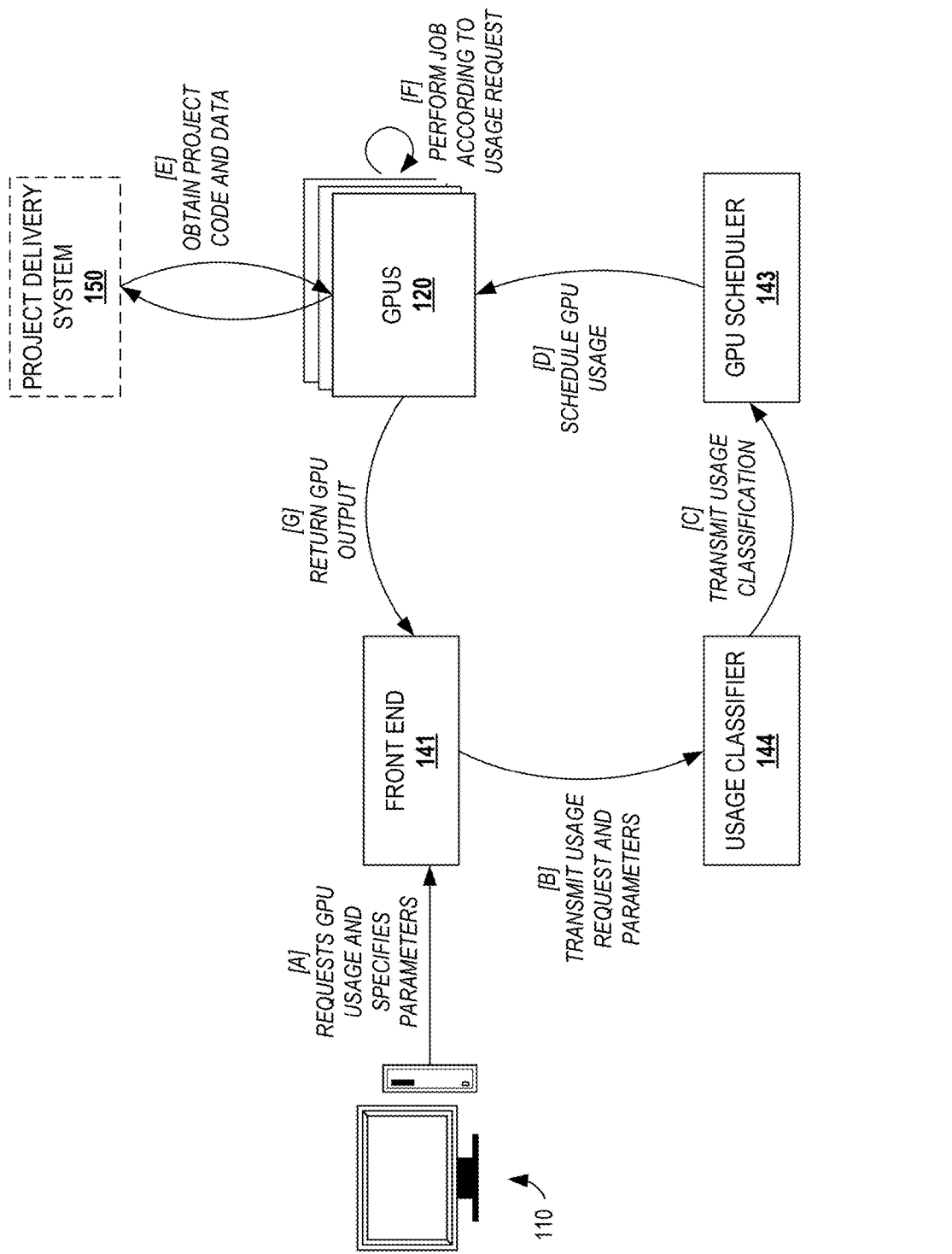
FIG. 2A is a block diagram illustrating various data flows and interactions between components of a scalable GPU allocation infrastructure system according to some embodiments.

FIG. 2A is a diagram of illustrative data flows and interactions between user devices 110, a front end 141, a usage classifier 144, a GPU scheduler 143, GPUs 120, and a project delivery system 150 to classify a job and allocate resources based on the classification.

At [A], the user devices 110 may transmit usage requests to the front end 141. The front end 141 may obtain information from the requests. For example, the usage requests may include job details such as a job type, a number of GPUs needed, and a requested time for job completion. By obtaining the requests to access pooled GPU resources for GPU usage jobs, the resource optimization system 140 may ensure resource allocation is based on actual demand and job requirements, rather than static allocation, which can lead to inefficiencies and underutilization of GPU resources.

At [B], the front end 141 may send the job details to the usage classifier 144. The usage classifier 144 may receive the job details from the front end 141 and classify the usage of the computational resources into distinct categories based on a job type and associated parameters, such as proximity parameters and timing constraints.

In some embodiments, the usage classifier 144 may classify the usage of the computational resources into a first subset of GPU usage jobs, a second subset of GPU usage jobs, a third subset of GPU usage jobs, or a fourth subset of GPU usage jobs. Jobs in the first subset of GPU usage jobs may be associated with a proximity parameter. The proximity parameter may correspond to GPUs facilitated by intra-cluster topological locality of the hosts in the cluster, which provides minimal interconnect latency within the cluster for both forward and backwards propagation of data. In this way, the jobs in the first subset of GPU usage jobs may include training models such as large language model training relying on high-speed data transfer between GPUs. In some embodiments, the proximity parameter provides for a formation of tightly connected GPU clusters. Jobs in the second subset of GPU usage jobs may be associated with a timing constraint. The timing constraint may correspond to scheduling jobs such that the GPUs are available for interactive use during a scheduled reservation. In some embodiments, the scheduled reservation may be after a start time (e.g., 9:00 AM) and before a completion time (e.g., 5:00 PM). In this manner, the resources may be allocated predictably and efficiently. Identifying a usage classification allows the GPU scheduler 143 to ensure the constraints or parameters of each job are met.

At [C], the GPU scheduler 143 may receive the classified uses from the usage classifier 144. In some embodiments, the GPU scheduler 143 may schedule jobs associated to the classified uses at least in part by solving a bin packing problem. For example, the GPU scheduler 143 may solve the bin packing problem by applying a greedy algorithm. The greedy algorithm may operate by making locally optimal choice at each decision node with an objective of finding a global optimum.

In some examples, when generating a schedule that solves the bin packing problem, the greedy algorithm may consider parameters or constraints for each of the usage types and/or a utilization rate for the computational resources. For example, the greedy algorithm may identify a group of available GPUs adjacent to one another that may satisfy more than one job across various usage types. In this way, the greedy algorithm may allocate resources for the first subset of usage jobs due to jobs in the first subset of usage jobs having a proximity parameter, which other usage types lack. By allocating the resources in this manner, the greedy algorithm may satisfy some of the jobs by making the locally optimum choice (i.e., allocating resources for the first subset of usage jobs) with the global objective of allocating resources to achieve a high expected utilization rate (e.g., 100% or substantially 100%).

In some embodiments, the GPU scheduler 143 may implement other NP-complete solutions to solve the bin packing problem. By solving the bin packing problem, the GPU scheduler 143 may prioritize the jobs according to their respective usage categories. In this manner, the GPU scheduler 143 may schedule the jobs to ensure efficient utilization of GPUs 120.

The GPU scheduler 143 may request allocation of GPU resources for the first subset of GPU usage jobs prior to allocation of the GPU resources for other GPU usage jobs. The inclusion of proximity parameters for the first subset of GPU usage jobs ensures that GPUs are allocated in a manner that minimizes latency and maximizes computational efficiency. For example, allocating GPUs within a single rack or on a common networking spine reduces interconnect latency, which provides for efficient training of large language models. The GPU scheduler 143 may schedule the second subset of GPU usage jobs after scheduling the first subset of GPU usage jobs. The second subset of GPU usage jobs may be associated with a timing constraint, which allows for predictable and efficient use of resources during specific hours, such as workday hours for interactive experimentation. The timing constraint may ensure that resources are available when needed and reduce the likelihood of resource contention. The GPU scheduler 143 may identify unused GPU resources and schedule jobs of another usage type (e.g., jobs of a usage type without a proximity parameter or timing constraint, or otherwise with more flexible job details) to improve overall utilization rates. In this manner, the GPU scheduler 143 may schedule the third subset of GPU usage jobs to remaining GPU resources, and in so doing the GPU scheduler 143 may ensure a high expected utilization rate of the available resources is achieved. By achieving the high expected utilization rate, the GPU scheduler 143 may achieve complete or substantially complete utilization of GPUs 120. In some embodiments, the GPU scheduler 143 may increase (or decrease) allocation of resources for jobs when the pooled GPU resources are below (or above) a particular utilization rate. Identifying unused GPU resources and scheduling jobs when resources are below the expected utilization rate ensures that minimal or substantially minimal resources are left idle. The dynamic allocation strategy helps in maintaining high resource utilization and reduces wastage.

In some embodiments, the GPU scheduler 143 may generate a schedule corresponding to a GPU resource budget and job overhead. In this manner, the GPU scheduler 143 may ensure GPU resources are allocated efficiently and according to each job. The GPU resource budget, which may correspond to GPU credits, allows for a quantifiable measure of resource allocation, ensuring GPU resources are distributed based on usage. In this manner, the GPU resource budget may prevent over-allocation and under-utilization of GPUs, optimizing the overall resource management. The job overhead, which may include various job requirements such as the number of GPUs needed, proximity of requested GPUs, time to run, time to setup the job, job start timing, job stop timing, and usage classification, may provide a comprehensive understanding of the resource demands of each job. The detailed information may allow the GPU scheduler 143 to make informed decisions about resource allocation, ensuring GPU resource usage achieves complete or substantially complete utilization of GPUs, when considering the specific jobs to be executed and the pool of GPUs available to execute the jobs. For example, if a job requests a number of GPUs located in close proximity to each other to minimize latency, the GPU scheduler 143 can allocate the resources accordingly. In some embodiments, by considering the time to run and job start/stop timings, the GPU scheduler 143 can schedule jobs in a way that maximizes GPU utilization and minimizes idle times. In this manner, the computational resources are used effectively, reducing wastage and improving the performance of GPU-intensive jobs.

At [D], the GPU scheduler 143 may schedule jobs for the GPUs 120 to perform. In some examples, the GPU control plane 145 may allocate the GPU resources from the pool of available GPUs 120 according to the schedule. The GPU control plane 145 may allocate, de-allocate, and/or re-allocate GPUs according to proximity parameters, timing constraints, and/or other factors applicable to allocation of computational resources.

At [E], the project delivery system 150 may send the project code and the project data to the GPUs 120, a process that may be referred to as "hydration." The project code and the project data may correspond to the jobs. The project code may include source code, libraries, files, documents, or other executable instructions allowing the GPUs to execute the job requested. The project data may include datasets (located local or remote), which may be data collected or synthetic data, allowing the GPUs to perform the job on data. For example, hydration of subset of GPUs may include deploying one or more replicas of a model to be trained, code to manage the training, training data to be used during training, and the like. As another example, hydration of a subset of GPUs may include deploying a model for inferencing, and operational data to be evaluated with the model during inferencing. In some embodiments, the project delivery system 150 may include software tools and services that facilitate the deployment of project code 151 and the storage and retrieval of project data from project datastore 152. In some examples, the GPUs 120 may retrieved the project code and project data to perform a job (e.g., following a "pull" protocol rather than a "push" protocol in which code and/or data is sent to the GPUs 120 by the control plane).

At [F], the GPUs perform the job according to the usage request. In some embodiments, the project code 151 may represent the executable code the user devices 110 may submit as part of the usage requests. The GPUs may process the project code to perform the jobs requested. The jobs may include training large language models, performing interactive experimentation, offline inferencing, customer access requests, data analysis, real-time graphics rendering, or other uses as requested for GPU usage.

At [G], the GPUs 120 may return an output from the GPUs 120 to the front end 141. In some embodiments, the front end 141 may present the results to the user devices 110. For example, the front end 141 may provide a graphical representation to display the results to the user devices 110. In some embodiments, the front end 141 may provide a downloadable or accessible link for the user devices 110 to access the output from the GPUs 120. In some embodiments, results are not provided to an interactive front end, but are instead stored in a data store (e.g., output of an offline inferencing job may be stored in a data store from where it may be accessed by interactive or automated systems).

Figure 2B:
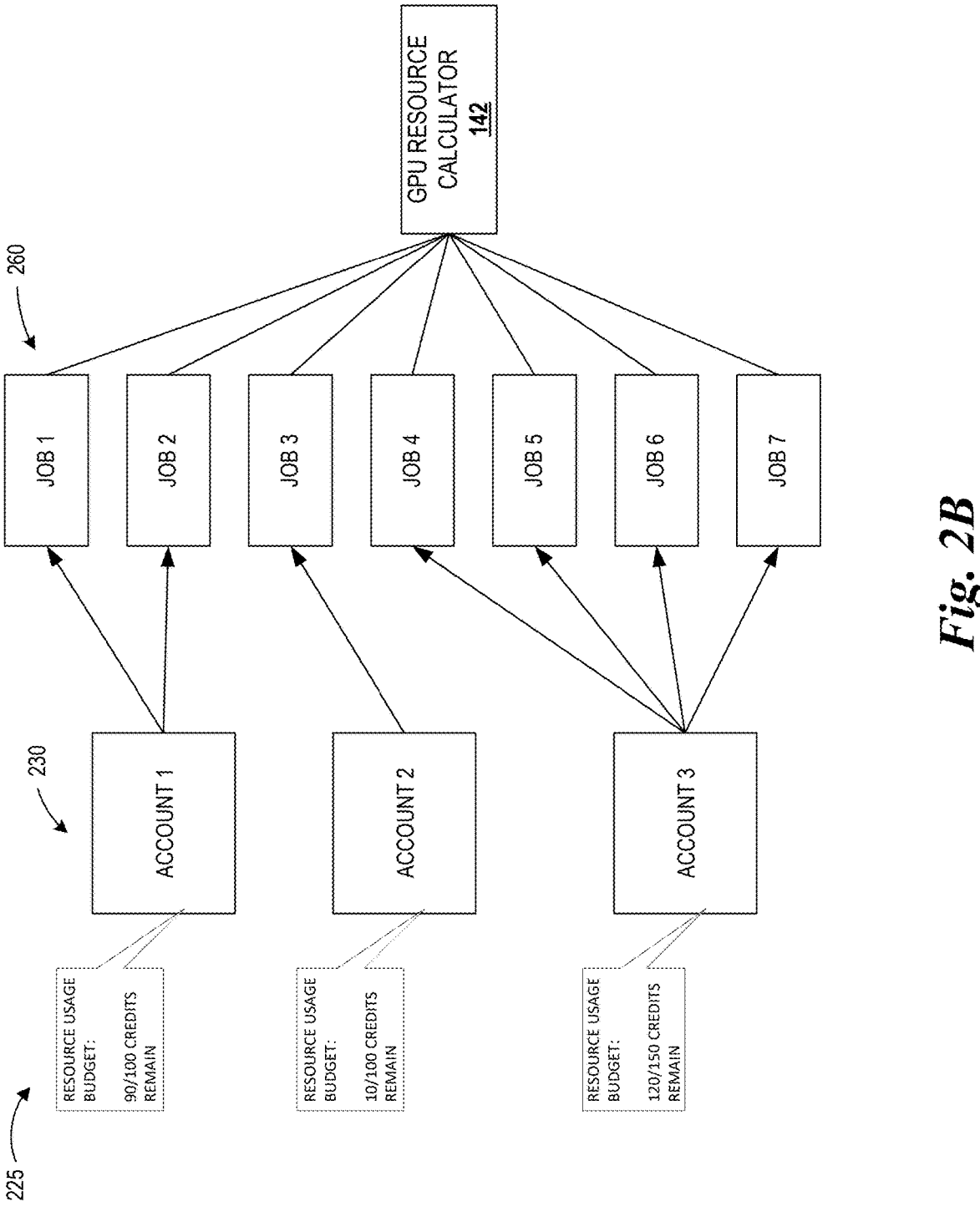
FIG. 2B is a diagram illustrating resource calculation according to some embodiments.

FIG. 2B illustrates a resource calculation diagram for determining resources for jobs in a job queue. The diagram includes accounts 230, a job queue 260, and a GPU resource calculator 142. The accounts 230 may each correspond to a respective engineer or team of engineers seeking to request GPU resources for various job usages. Each of the accounts 230 may have a resource usage budget associated to the account. For example, each of the accounts 230 may have a limit on GPU resources that may be allocated for use by the account. In some embodiments, the limit on GPU resources may be defined in terms of credits. For example, the credits may correspond to time-resource quantum (such as 1-hour time quantum on a single GPU, with job start times generally beginning on-the-hour), a number of jobs, power usage requirements, or other job usage parameters. To track account usage of computational resources and ensure efficient scheduling of jobs, the accounts 230 may use at least one credit (or quanta) for each individual GPU.

In some embodiments, the accounts 230 may request usage jobs organized in the job queue 260. Some queued jobs may involve multiple GPUs (for example, dozens, hundreds, thousands, or more GPUs). In some examples, the GPU resource calculator 142 may determine a "cost" (e.g., in terms of credits) of a job requested by one of the accounts 230. The GPU resource calculator 142 may compare the cost with the account's GPU resource budget. The GPU resource budget may include available credits (which also may be referred to herein as "time quanta"). The GPU resource calculator 142 may assess whether the account holds a sufficient GPU resource budget to perform the job. The GPU resource calculator 142 may send the job to the GPU scheduler 143 if the account has sufficient credits as compared to the cost of the job. In some embodiments, the GPU resource calculator 142 may deduct costs from the budgets of accounts 230. The GPU resource calculator 142 may control demand across the accounts 230 to maximize GPU resource utilization. When the GPU resource calculator 142 identifies idle GPU capacity, the GPU resource calculator 142 may support bursting, which may accelerate development (constrained to remain within the credits of each of the accounts 230). Bursting may include allocating idle GPU capacity to jobs being performed to accelerate performance of the job.

In some embodiments, each of the accounts 230 can schedule jobs for certain numbers of credits over a period of time, such as each day. The system 225 may limit initial job reservations to a daily-funded-run-rate for each of the accounts 230, which may be as follows:

$$\text{daily funded run rate} = \frac{\text{funded budget remaining}}{\text{funded remaining duration}}$$

Where the daily funded run rate may correspond to a daily rate at which each of the accounts 230 can use all of the account's credits by the end of a term, the funded budget remaining may include a number of credits available to each of the accounts 230, and funded remaining duration may include the term associated to the credits (for example, the term may be a week, month, quarter, year, etc.). The system 225 may ensure an aggregate funded run rate matches the available pool capacity. By restricting initial reservations as shown above, the system 225 may ensure reserved availability, and avoid neglecting an account. Whenever availability exceeds the initial reservations, the system 225 may schedule usage among the accounts 230 which requested accelerated progress (i.e., use the resource usage budget sooner than later when possible).

In some embodiments, some of the accounts 230 may provide GPU resources to the pool of GPUs. The resource usage budget may increase (or decrease) according to the provided GPU resources. For accounts bringing pre-allocated GPUs into the pooled GPU resources, a resource usage budget may include the following:

$$\text{funded budget remaining} = (\text{\# of GPUs})*(\text{instance budget rate})*(\text{funded hours remaining})$$

Where the funded budget remaining is as disclosed herein, the number of GPUs may correspond to a number of GPUs in the pooled GPU resources, the instance budget rate may correspond to a rate of a cost to use the pre-allocated GPUs (for example, a cost per hour), and the funded hours remaining may include a quantity of hours available to the account to use the pooled GPU resources.

The GPU resource calculator 142 may provide GPU resource requirements for performing the jobs to assist in scheduling the jobs for efficient allocation of computational resources. To obtain the GPU resource requirements, the GPU resource calculator 142 may determine a cost associated to performing a job for a requesting account 230 (for example, job details may identify GPU resources requested to perform the job). The GPU resource calculator may compare a GPU resource budget for the requesting account 230 to the cost of the job. In some embodiments, if the account 230 has enough credits in its GPU resource budget, the GPU resource calculator 142 may send the job to the GPU scheduler (such as GPU scheduler 143 in FIG. 1). The GPU scheduler may schedule jobs according to the assessment by the GPU resource calculator 142. For example, the GPU scheduler may compare the GPU resources requested by the accounts 230 to the available GPUs to determine how best to schedule the jobs. In this way, the GPU scheduler may consider the job parameters (or constraints) and the average expected utilization rate (i.e., solve the bin packing problem).

As illustrated in FIG. 2B, each of the accounts 230 is shown to have a corresponding resource usage budget. For example, Account 1 has a resource usage budget of 90/100 credits remaining, Account 2 has a resource usage budget of 10/100 credits remaining, and Account 3 has a resource usage budget of 120/150 credits remaining. In this manner, when credits correspond to 1-hour time-quanta, Account 1 may have 90 hours of GPU usage time remaining for a term (such as for the remainder of the month).

Figure 2C:
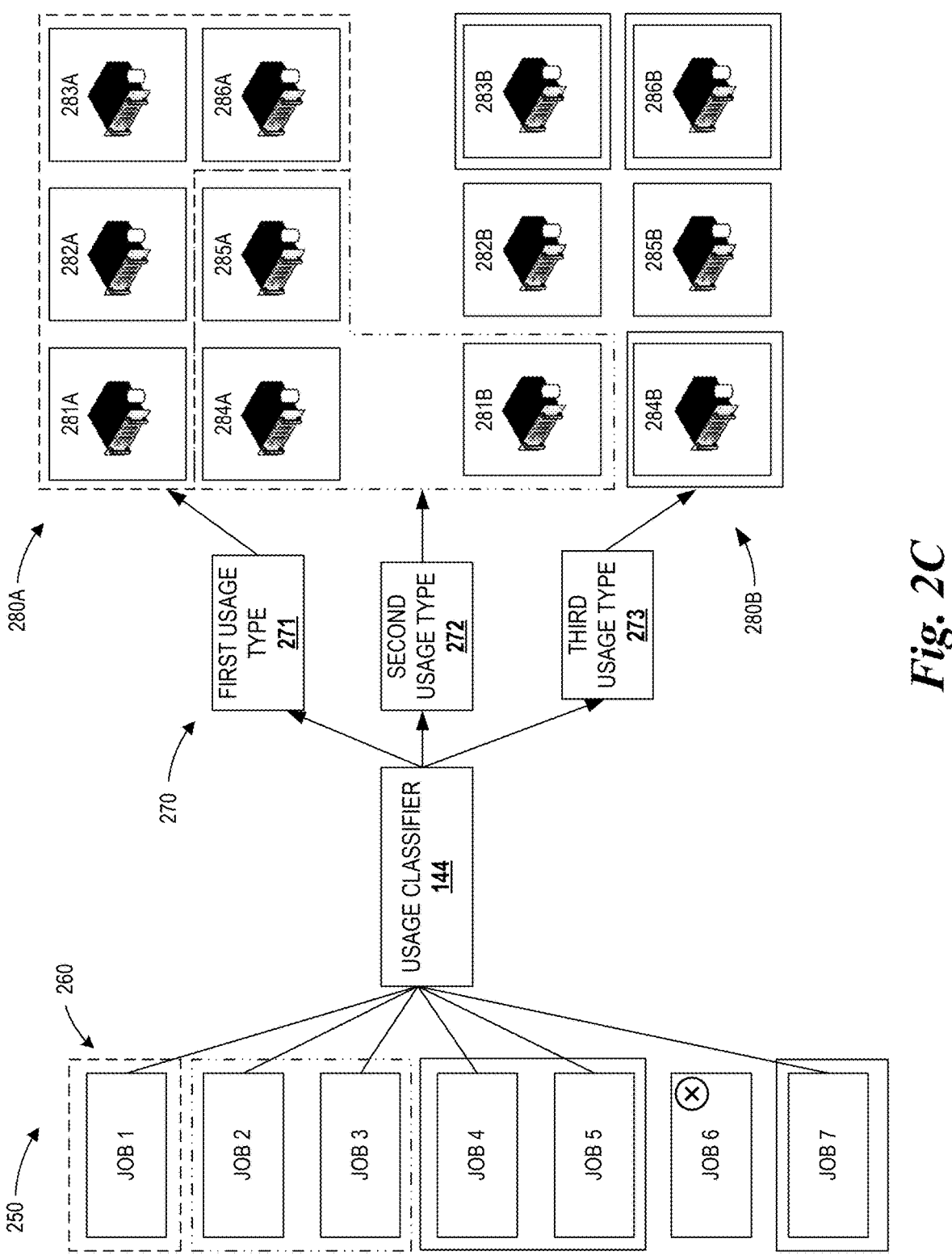
FIGS. 2C-2D are diagrams illustrating allocation of GPU resources for job classes according to some embodiments.
Figure 2D:
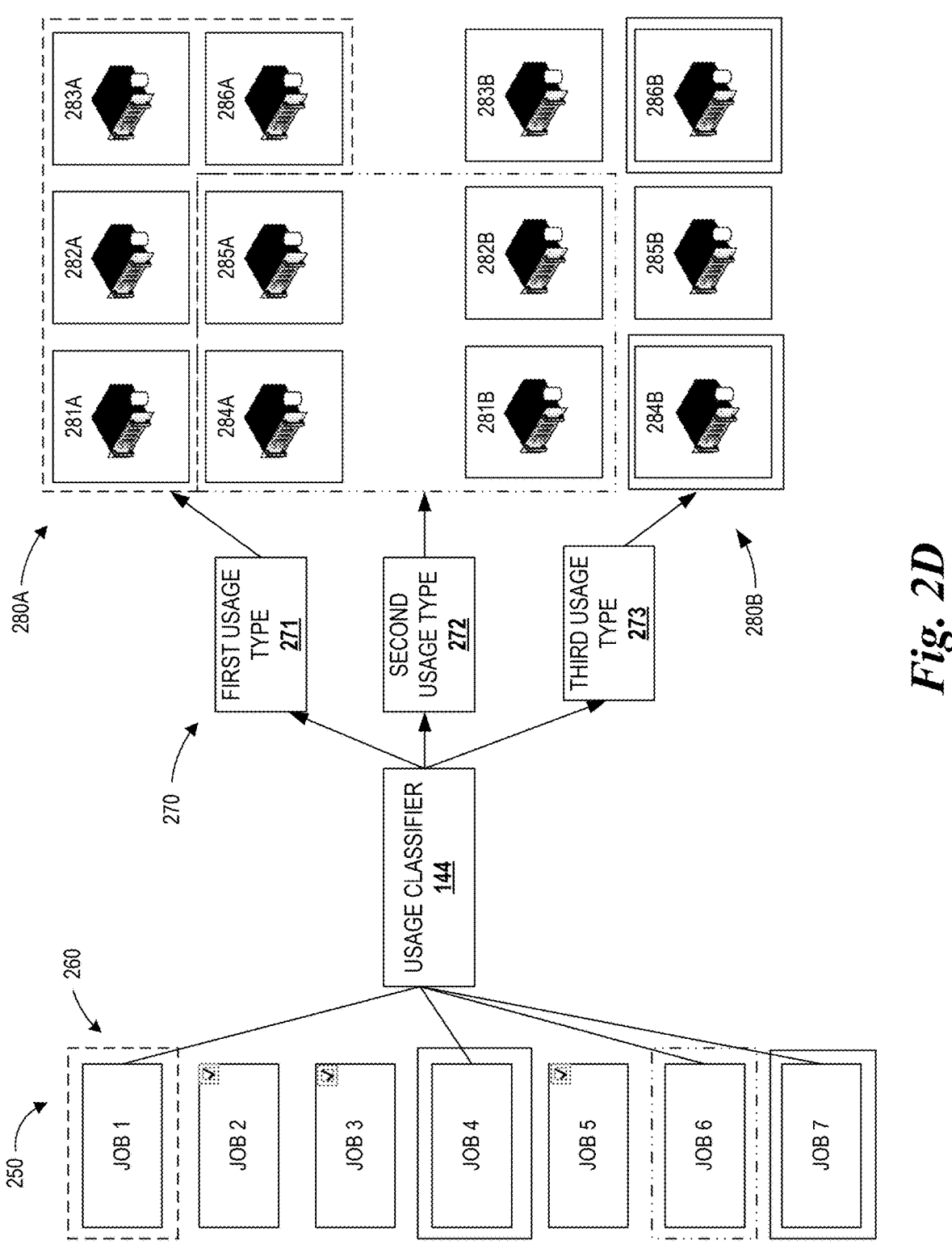

FIGS. 2C-2D illustrate a resource allocation system 250 for classifying jobs into different usage types and allocating GPU resources (or other machine learning accelerators) accordingly. The system 250 may include a job queue 260, a usage classifier 144, a classification queue 270, a first cluster of GPUs 280A, and a second cluster of GPUs 280B. The classification queue 270 may include a first usage type 271, a second usage type 272, and a third usage type 273. The first cluster of GPUs 280A may include GPUs 281A, 282A, 283A, 284A, 285A, and 286A. The second cluster of GPUs 280B may include GPUs 281B, 282B, 283B, 284B, 285B, and 286B.

The job queue 260 may represent a plurality of jobs submitted by user devices (such as user devices 110 in FIG. 1) requesting GPU resources. The job queue 260 may include jobs such as training large language models, performing interactive experimentation, offline inferencing, customer access requests, data analysis, real-time graphics rendering, or other uses as requested for GPU usage. Each job within the job queue 260 may be associated with parameters such as the number of GPUs needed, the estimated time for job completion, and the job type, which are considered by usage classifier 144 for classification.

The usage classifier 144 may classify each job from the job queue 260 into one of the usage types of the classification queue 270. The usage classifier 144 may classify the jobs in the job queue 260 based on parameters such as job type and resource requirements. The usage classifier 144 may evaluate the characteristics of each job and assign the job to the first usage type 271, second usage type 272, or third usage type 273, which may correspond to different job requirements and GPU configurations.

The first usage type 271 may correspond to jobs such as training large language models. In the illustrated example, the usage classifier 144 may identify job 1 as a first usage type. Based on the classification, a first subset of GPUs (such as GPUs 281A, 282A, 283A, and 286A) may be allocated. For example, the GPU scheduler 143 may allocate the first subset of GPUs for job 1 based on a proximity parameter. The proximity parameter may indicate a requirement or preference for allocating GPUs within a single rack or on a common networking spine to reduce interconnect latency, which is desirable for efficient training of large language models and other compute-intensive jobs. The GPUs 281A, 282A, 283A, and 286A may be individual GPUs allocated based on the first usage type 271 to perform job 1. The GPUs 281A, 282A, 283A, and 286A may be selected based on the proximity parameter, which ensures minimal latency.

The second usage type 272 may correspond to jobs such as interactive training or experimentation. In the illustrated example, the usage classifier 144 may identify jobs 2 and 3 as second usage types. Based on this classification, a second subset of GPUs (such as GPUs 284A, 285A, and 281B) may be allocated. For example, the GPU scheduler 143 may allocate the second subset of GPUs for jobs 2 and 3 after jobs in the first usage type 271. The GPUs within the second usage type 272 may be reserved for jobs less location-sensitive than those in the first usage type 271, but instead for jobs that have a timing constraint (e.g., the GPUs are to be available at certain times). The second usage type 272 may provide a balanced allocation meeting the less location sensitive but more availability-sensitive needs of these jobs. The GPUs 284A, 285A, and 281B may be individual GPUs allocated to the second usage type 272. The GPUs 284A, 285A, and 281B may be selected based on the timing constraint for jobs 2 and 3, which may allow for predictable and efficient use of resources during predetermined hours. The predetermined hours may include workday hours for interactive experimentation. The timing constraint may ensure the resources are available when requested and reduces the likelihood of resource contention.

The third usage type 273 may correspond to jobs such as offline inferencing. In the illustrated example, the usage classifier 144 may identify jobs 4, 5, and 7 as third usage types. Based on this classification, the GPU scheduler 143 may allocate a third subset of GPUs (such as GPUs 283B, 284B, and 286B). For example, the GPU scheduler 143 may allocate the third subset of GPUs for jobs 4, 5, and 7, which may be allocated in remaining resources after scheduling jobs in the first usage type 271 and second usage type 272. The third usage type 273 may be reserved for jobs that can be scheduled to utilize remaining GPU resources after allocating resources for jobs associated to the first usage type 271 and the second usage type 272. The jobs for the third usage type 273 may have reduced urgency to resources than other usage types and may be flexible in timing and resource requirements (for example, completing the job prior to a deadline). The GPUs 283B and 284B may be individual GPUs allocated to the third usage type 273. The allocation of GPUs to the third usage type 273 may ensure the resource usage maintains an average expected utilization rate by filling in any unused GPU capacity with the jobs for the third usage type 273.

As illustrated in FIGS. 2C-2D, the job queue 260 includes seven example jobs (such as the jobs requested from the accounts 230 as disclosed in FIG. 2C). FIG. 2C shows the usage classifier 144 classifying jobs 1-5 and job 7 into a corresponding usage type (first usage type, second usage type, or third usage type). In some examples, job 6 may remain paused or not yet started (as indicated with an "x" for job 6) due to unavailability of resources to perform the job or until the corresponding account obtains additional credits. The GPU scheduler 143 may determine the GPU resources are unavailable to perform each job simultaneously. For example, job 6 may request four GPUs, which may be unavailable across the first cluster of GPUs 280A and the second cluster of GPUs 280B.

FIG. 2D shows the usage classifier 144 classifying jobs 1, 4, and 6-7 into a corresponding usage type (first usage type, second usage type, or third usage type). In the illustrated example, jobs 2, 3, and 5 have completed (as indicated with a check mark) and the job queue 260 may update. In this manner, GPU resources may become available in the first cluster of GPUs 280A and/or the second cluster of GPUs 280B. The GPU scheduler 143 may determine the GPU resources are available to perform the remaining jobs simultaneously. For example, job 6 requests four GPUs to perform the job, which are available across the first cluster of GPUs 280A and/or the second cluster of GPUs 280B.

FIG. 3 is a flow diagram of an illustrative routine 300 that may be executed by a resource optimization system 140 to classify usage of computational resources and manage computational resource allocation. The routine 300 may begin in response to an event, such as receipt by a resource optimization system of a request to perform a job using GPU resources (or other machine learning accelerators). For example, a client device may submit a request including or referencing a job to be performed (e.g., by job queuing in a user interface, text-based instruction or read-eval-print loop (REPL) interface, or another identifier). The request may further include or reference the type of job usage (e.g., training large language models, performing interactive experimentation, offline inferencing, customer access requests, data analysis, real-time graphics rendering, and/or other uses as requested for GPU usage).

When the routine 300 is initiated, a set of executable program instructions stored on one or more non-transitory computer-readable media (e.g., hard drive, flash memory, removable media, etc.) may be loaded into memory (e.g., random access memory or "RAM") of a resource optimization system, such as the resource optimization system 140 shown in FIG. 1, and executed by one or more processors. In some embodiments, the routine 300 or portions thereof may be implemented on multiple processors, serially or in parallel.

At block 302, the resource optimization system 140 may classify a first subset of GPU usage jobs in a first usage type associated with a proximity parameter. In some embodiments, classifying may assist in scheduling the first set of GPU usage jobs and the eligibility for GPU resource allocation. In some embodiments, the resource optimization system 140 may classify the first set of GPU usage jobs based on a job type and associated parameters such as a proximity parameter. The proximity parameter may be as disclosed herein (such as in FIG. 2A). For example, the proximity parameter may correspond to GPUs allocated for the first set of GPU usage jobs being physically adjacent within a networked environment. In this manner, the arrangement may minimize interconnect latency, which may be of use for training models such as large language model training relying on high-speed data transfer between GPUs. In some embodiments, the proximity parameter may provide for a formation of tightly connected GPU clusters.

At block 304, the resource optimization system 140 may classify a second subset of GPU usage jobs in a second usage type associated with a timing constraint. In some embodiments, classifying may assist in scheduling jobs in the second subset of GPU usage jobs and the eligibility for GPU resource allocation. In some embodiments, the resource optimization system 140 may classify the second subset of GPU usage jobs based on a job type and associated parameters such as a timing constraint. The timing constraint may be as disclosed herein. For example, the timing constraint may correspond to scheduling jobs during a scheduled reservation. In some embodiments, the scheduled reservation may be after a start time (e.g., 9:00 AM) and before a completion time (e.g., 5:00 PM). In this manner, the resources may be allocated predictably and efficiently.

At block 306, the resource optimization system 140 may classify a third subset of GPU usage jobs in a third usage type. In some embodiments, classifying may assist in scheduling jobs in the third subset of GPU usage jobs and the eligibility for GPU resource allocation. In some embodiments, the third subset of GPU usage jobs may be scheduled after jobs in the first and second subsets of GPU usage jobs.

At block 308, the resource optimization system 140 may execute, using a first subset of GPUs from a GPU pool, individual usage jobs classified in the first usage type. The resource optimization system 140 may allocate the first subset of GPUs to perform at least a portion of the first subset of usage jobs. In some embodiments, the resource optimization system 140 may allocate the first subset of GPUs according to the proximity parameter. In this manner, the first subset of GPUs may correspond to a network architecture meeting the proximity parameter (such as disclosed herein).

At block 310, the resource optimization system 140 may execute, using a second subset of GPUs from the GPU pool, individual usage jobs classified in the second usage type. The resource optimization system 140 may allocate the second subset of GPUs to perform at least a portion of the second subset of usage jobs. In some embodiments, the resource optimization system 140 may allocate the second subset of GPUs according to the timing constraint. In this manner, the resource optimization system 140 may allocate the second subset of GPUs during a predetermined timeframe (such as disclosed herein).

At block 312, the resource optimization system 140 may execute, using a third subset of GPUs remaining from the GPU pool, individual usage jobs classified in the third usage type. The resource optimization system 140 may allocate the third subset of GPUs to perform at least a portion of the third subset of usage jobs. In some embodiments, the resource optimization system 140 may allocate the third subset of GPUs according to remaining GPU resources. In some embodiments, the third subset of GPUs may be remaining GPU resources after allocating GPUs to the first and second subsets of GPUs. In this manner, the resource optimization system 140 may schedule jobs from the third subset of usage jobs to achieve an expected utilization rate for the GPU resources.

In some embodiments, the resource optimization system 140 may perform some or all of the classification operations as disclosed in the routine 300 (e.g., blocks 302, 304, 306) in a different order or in parallel. The execution of some or all of the jobs using the subsets of GPUs (e.g., blocks 308, 310, 312) may be performed in a different order or in parallel. In some embodiments, the routine 300 may be executed in a loop or asynchronously as new jobs are requested, as jobs finish, as jobs are paused, or in other situations in which the routine 300 is implemented.

Example Resource Optimization System

Figure 4:
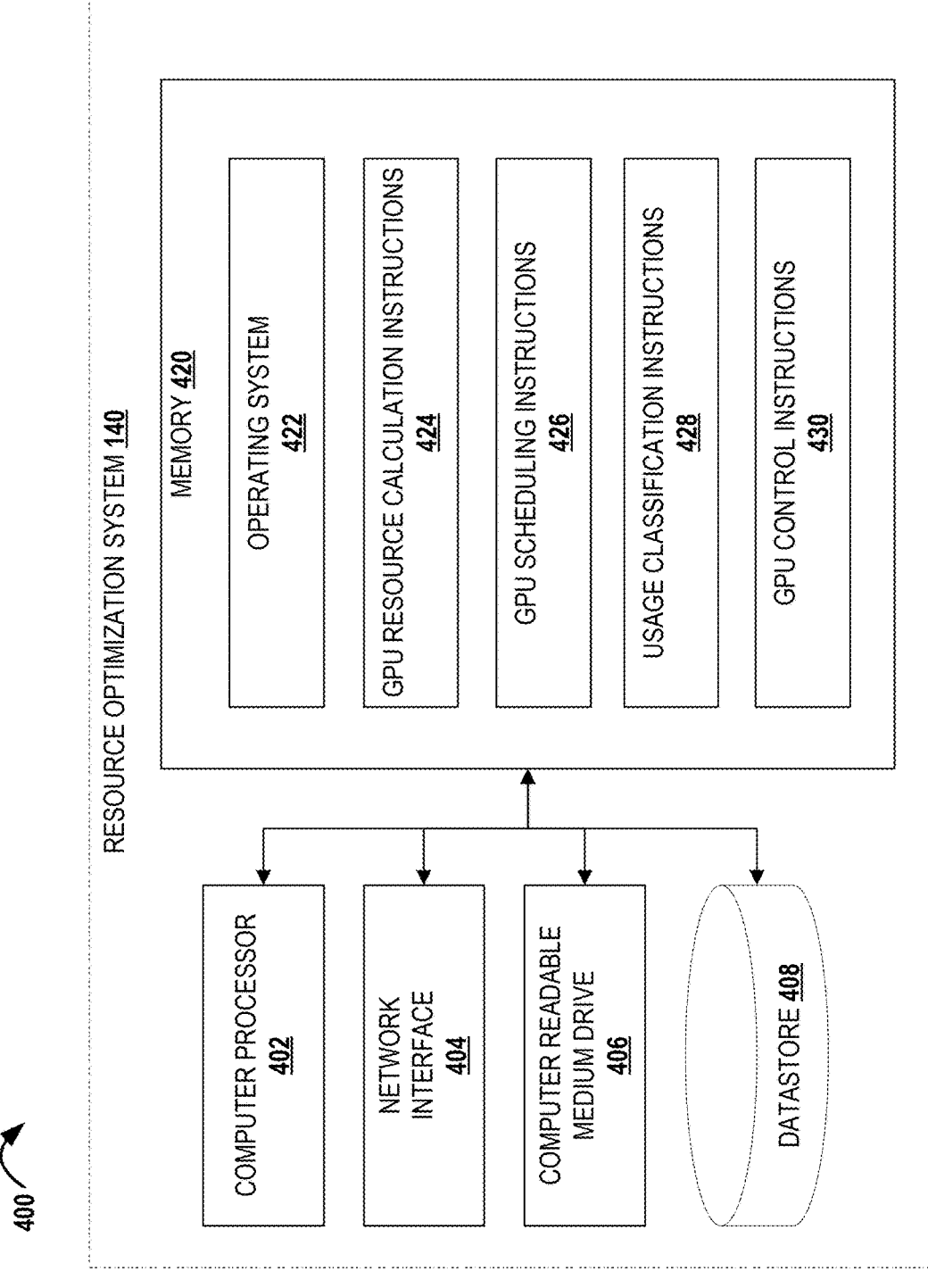
FIG. 4 is a block diagram of an illustrative computing system configured to classify usage jobs and allocate GPU resources according to some embodiments.

FIG. 4 illustrates various components of an example computing device 400 configured to implement various functionality of the resource optimization system 140.

In some embodiments, as shown, the resource optimization system 140 may include: one or more computer processors 402, such as physical central processing units ("CPUs"); one or more network interfaces 404, such as a network interface cards ("NICs"); one or more computer-readable medium drives 406, such as a high density disk ("HDDs"), solid state drives ("SSDs"), flash drives, and/or other persistent non-transitory computer-readable media;

one or more datastore 408, such as physical storage and/or remote storage, and/or other data storage components; and one or more computer-readable memories 420, such as random access memory ("RAM") and/or other volatile non-transitory computer-readable media.

The computer-readable memory 420 may include computer program instructions that one or more computer processors 402 execute in order to implement one or more embodiments. The computer-readable memory 420 can store an operating system 422 that provides computer program instructions for use by the computer processor(s) 402 in the general administration and operation of the resource optimization system 140.

In some embodiments, the computer-readable memory 420 can further include computer program instructions and other information for implementing aspects of the present disclosure. For example, the computer-readable memory 420 may include GPU resource calculation instructions 424 for computing GPU resources requested and/or resources available, as described herein. As another example, the computer-readable memory 420 may include GPU scheduling instructions 426 for scheduling job to allocated GPU resources, as described herein. As another example, the computer-readable memory 420 may include usage classification instructions 428 for classifying usage of computational resources according to various usage types, as described herein. As a further example, the computer-readable memory 420 may include GPU control instructions 430 for managing the GPU resources, as described herein.

When a routine is initiated, a corresponding set of executable program instructions stored on a computer-readable medium drive 406 may be loaded into computer-readable memory 420 and executed by one or more computer processors 402. In some embodiments, a routine—or portions thereof—may be implemented on multiple computing devices and/or multiple processors, serially or in parallel.

Terminology and Additional Considerations

All of the methods and jobs described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and jobs may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system comprising:
   a non-transitory data store storing computer-executable instructions; and
   one or more processors in communication with the non-transitory data store, wherein the computer-executable instructions, when executed by the one or more processors, configure the one or more processors to:
   obtain a plurality of requests to access pooled graphic processing unit (GPU) resources for GPU usage jobs, wherein a first request of the plurality of requests includes a time estimate for completing a first GPU usage job and a number of GPUs requested for the first GPU usage job;
   identify usage classifications according to the plurality of requests and the GPU usage jobs, wherein a first usage classifications comprises, for the first GPU usage job, at least one of a first subset of GPU usage jobs, a second subset of GPU usage jobs, and a third subset of GPU usage jobs,
   wherein the first subset of GPU usage jobs is scheduled to use GPU resources to train large language models, wherein GPU resources for the first subset of GPU usage jobs are associated with a proximity parameter, wherein the proximity parameter corresponds to a plurality of GPUs adjacent to perform the first subset of GPU usage jobs, wherein the plurality of GPUs are physically adjacent within a networked environment,
   wherein the second subset of GPU usage jobs is scheduled to use the GPU resources for interactive use, wherein the GPU resources for the second subset of GPU usage jobs are associated with a timing constraint for the second subset of GPU usage jobs to be performed during an N-hour reservation after a start time,
   wherein the third subset of GPU usage jobs is scheduled to use remaining GPU resources of the pooled GPU resources, wherein the GPU resources for the third subset of GPU usage jobs include executing offline inferencing models on available GPU resources;
   allocate available GPU resources to perform the GPU usage jobs;
   control the available GPU resources to perform the GPU usage jobs;
   identify unused GPU resources from the pooled GPU resources; and
   schedule the GPU usage jobs from the third subset of GPU usage jobs to achieve a high utilization rate.

2. The system of claim 1, wherein to allocate the available GPU resources, the one or more processors are configured to use a greedy algorithm, wherein the greedy algorithm allocates resources to the GPU usage jobs according to the usage classifications.

3. The system of claim 1, wherein the one or more processors are further configured to, in response to identifying the unused GPU resources, schedule additional jobs when the pooled GPU resources are below an average expected utilization rate.

4. The system of claim 1, wherein allocation of resources is computed at least in part by solving for a bin packing problem corresponding to the usage classifications.

5. A computer-implemented method comprising:

under control of a computing system comprising memory and one or more computer processors configured to execute specific instructions:

classifying a first subset of graphics processing unit (GPU) usage jobs in a first class associated with a proximity parameter;

classifying a second subset of GPU usage jobs in a second class associated with a timing constraint;

classifying a third subset of GPU usage jobs in a third class;

executing, using a first subset of GPUs from a GPU pool, a first set of individual usage jobs classified in the first class;

executing, using a second subset of GPUs from the GPU pool, a second set of individual usage jobs classified in the second class; and executing, using a third subset of GPUs remaining from the GPU pool after excluding the first subset of GPUs and the second subset of GPUs, a third set of individual usage jobs classified in the third class.

6. The computer-implemented method of claim 5, wherein the proximity parameter corresponds to a preference for each of a plurality of GPUs for performing the first subset of GPU usage jobs being located, within a networked environment, adjacent to each other GPU of the plurality of GPUs within the networked environment.

7. The computer-implemented method of claim 5, wherein the first subset of GPU usage jobs includes large language model training.

8. The computer-implemented method of claim 5, wherein the timing constraint corresponds to performing the second subset of GPU usage jobs during a scheduled reservation after a start time and before a completion time.

9. The computer-implemented method of claim 5, wherein the second subset of GPU usage jobs includes interactive experimentation.

10. The computer-implemented method of claim 5, wherein the third subset of GPU usage jobs includes jobs allocated a particular number of GPU hours by a particular deadline, wherein the third subset of GPU usage jobs is performed without being associated with the proximity parameter or the timing constraint, wherein the third subset of GPU usage jobs is performed with GPUs remaining after assigning the first subset of GPUs to perform the first subset of GPU usage jobs and the second subset of GPUs to perform the second subset of GPU usage jobs.

11. The computer-implemented method of claim 5, wherein the third subset of GPU usage jobs includes offline inferencing.

12. The computer-implemented method of claim 5, further comprising:

classifying a fourth subset of GPU usage jobs in a fourth class; and executing, using a fourth subset of GPUs from a GPU pool, a fourth set of individual usage jobs classified in the fourth class, wherein the fourth subset of GPU usage jobs includes customer access.

13. The computer-implemented method of claim 5, wherein executing the GPU usage jobs is based at least in part on an account associated to each of the GPU usage jobs, wherein the account corresponds to a resource usage budget used to allocate GPU resources from the GPU pool.

14. A system comprising:

a non-transitory data store storing computer-executable instructions; and a processor in communication with the non-transitory data store, wherein the computer-executable instructions, when executed by the processor, configure the processor to:

classify a first subset of resource usage jobs in a first class associated with a proximity parameter;

classify a second subset of resource usage jobs in a second class associated with a timing constraint;

classify a third subset of resource usage jobs in a third class;

execute, using a first subset of computational resources from a computational resource pool, a first set of individual usage jobs classified in the first class;

execute, using a second subset of computational resources from the computational resource pool, a second set of individual usage jobs classified in the second class; and execute, using a third subset of computational resources remaining from the computational resource pool after excluding the first subset of computational resources and the second subset of computational resources, a third set of individual usage jobs classified in the third class.

15. The system of claim 14, wherein the proximity parameter corresponds to a preference for each a plurality of computational resources for performing the first subset of resource usage jobs being located, within a networked environment, adjacent to each other computational resource of the plurality of computational resources within the networked environment.

16. The system of claim 14, wherein the first subset of resource usage jobs includes large language model training.

17. The system of claim 14, wherein the timing constraint corresponds to performing the second subset of resource usage jobs during a scheduled reservation after a start time and before a completion time.

18. The system of claim 14, wherein the second subset of resource usage jobs includes interactive experimentation.

19. The system of claim 14, wherein the third subset of resource usage jobs includes jobs allocated a particular number of computational resource hours by a particular deadline, wherein the third subset of resource usage jobs is performed without being associated with the proximity parameter or the timing constraint, wherein the third subset of resource usage jobs is performed with computational resources remaining after assigning the first subset of computational resources to perform the first subset of resource usage jobs and the second subset of computational resources to perform the second subset of resource usage jobs.

20. The system of claim 14, wherein the third subset of resource usage jobs includes offline inferencing.

\* \* \* \* \*